UNITED STATES PATENT OFFICE.

WOLF LAUFER, OF CRACOW, AUSTRIA-HUNGARY.

PROCESS FOR THE PRODUCTION OF ARTIFICIAL STONE FROM NATURAL-ROCK WASTE.

1,094,727.  Specification of Letters Patent.  Patented Apr. 28, 1914.

No Drawing.   Application filed September 7, 1912.  Serial No. 719,083.

*To all whom it may concern:*

Be it known that I, WOLF LAUFER, a subject of the Emperor of Austria-Hungary, residing at Staravislna 1, Cracow, Austria-Hungary, have invented a new and useful Improvement in Processes for the Production of Artificial Stone from Natural-Rock Wastes; and I do hereby declare that the following is a full, clear, and exact description of the invention, which will enable others skilled in the art to which it appertains to make and use the same.

It has been proposed to employ an admixture of clay or waterglass for making artificial stone by calcining rock waste, which contains feldspar or which will soften in fire. When clay is employed, it is, however, very difficult to obtain closely burning and yet sufficiently stable masses, while the bodies thus formed will easily assume a glass like structure. On the other hand waterglass when used gives the products an objectionable color.

The present invention relates to the utilization of the smalls and waste produced in quarrying and working porphyry, graywacke, basalt, granite and similar kinds of rock, which have the property of vitrifying or cementing in fire.

To avoid the above mentioned troubles, the rock waste is composed of coarse and fine granulations; the two following materials being added; phosphate of alumina and carbonate of sodium (soda). The mixture is then slightly wetted, pressed to the desired shape and burnt to form artificial stones.

When porphyry is employed, the coarse granular part may contain pieces up to 5 mm. in size. Rock meal is added in such quantity, that the mass will become very dense in burning. As an admixture, porphyry is particularly suited which has been somewhat weathered, such as porphyry tuff. The soda and phosphate of alumina are added in the form of a fine meal, to about 10 per cent. If necessary the clinkering process is also regulated by an admixture of lime and silica. The burning temperature is between 1100 to 1200 centigrade.

By the new cementing media employed, namely the soda and the phosphate of alumina, the stability of the artificial stone is increased and bodies of a crystalline, and not glass-like structure are obtained. Thus artificial stones are produced which are fully equal to native rock and may be used either as paving slabs or for building façades, monuments and the like.

For increasing the cementing power of the mass, colloidal alumina, that is hydrate of alumina, which is freshly precipitated and contains a great surplus of water, is added to the raw mixture.

What I claim is:—

1. A method of making artificial stone from the waste of native rocks which are able to vitrify in fire, by mixing coarse and fine granulations of such rocks, with phosphate of alumina and carbonate of sodium, compressing the mixture while in a slightly moistened state and burning the thus molded stone.

2. A method of making artificial stone from the waste of native rocks which are able to vitrify in fire, by mixing coarse and fine granulations of such rocks with phosphate of alumina, carbonate of sodium, and precipitated colloidal alumina the said mixture being thereafter compressed while in a slightly moistened state and the thus molded stone being burnt.

In testimony whereof I affix my signature in presence of two witnesses.

WOLF LAUFER.

Witnesses:
 WOLDEMAR HAUPT,
 HENRY HASPER.